United States Patent [19]

Barnett

[11] Patent Number: 4,544,932

[45] Date of Patent: Oct. 1, 1985

[54] INK JET APPARATUS AND METHOD OF MAKING THE APPARATUS

[75] Inventor: Don C. Barnett, Berwyn, Pa.

[73] Assignee: Exxon Research and Engineering Co., Florham Park, N.J.

[21] Appl. No.: 604,128

[22] Filed: Apr. 26, 1984

[51] Int. Cl.[4] .............................................. G01D 15/18

[52] U.S. Cl. .................................................. 346/140 R

[58] Field of Search .................................... 346/140 R

[56] References Cited

U.S. PATENT DOCUMENTS 4,418,355 11/1983 De Young .......................... 346/140

4,459,601 7/1984 Howkins ............................ 346/140

*Primary Examiner*—Joseph W. Hartary

[57] ABSTRACT

An ink jet apparatus with a laminated structure includes a chamber plate, a diaphram and a transducer body. A compliant material preloads the diaphram at the chambers. The thickness of the compliant material is controlled by a spacer element located between the diaphram and the transducer body.

19 Claims, 4 Drawing Figures

INK JET APPARATUS AND METHOD OF MAKING THE APPARATUS

BACKGROUND OF THE INVENTION

This invention relates to an ink jet apparatus wherein droplets of ink are ejected from an orifice of an ink jet.

U.S patent applications Ser. No. 336,603, filed Jan. 4, 1982, now U.S. Pat. No. 4,459,601, and Ser. No. 576,582, filed Feb. 3, 1984 disclose impulse or demand ink jets capable of operating in a synchronous fill-before-fire mode. When operating in this mode, the ejection of a droplet is first preceded by the filling of the ink jet chamber in response to energization of the transducer and the resulting enlargement of the chamber upon demand. Subsequently, a synchronous period of time thereafter, the transducer is de-energized and the volume of the chamber is allowed to contract to its initial state resulting in the ejection of a droplet from the orifice of the ink jet chamber. In one embodiment described in the aforesaid patent applications, a diaphram is utilized between the transducer and the ink jet chamber and the diaphram retracts along with the transducer upon energization of the transducer.

When utilizing a diaphram, it is particularly important that the diaphram actually retract with the transducer upon energization of the transducer so as to allow filling of the chamber. This may be accomplished by preloading the diaphram so as to take advantage of the memory of the diaphram as shown in U.S. Pat. No. 4,418,355. One method of preloading involves the use of a compliant or visco-elastic material between the diaphram and the foot of the transducer.

As should be understood by those of ordinary skill in the art, it is particularly important to control the dimensions of the ink jet chamber to assure the proper formation and ejection of droplets from the orifice of the chamber. Similarly, it is important to maintain uniformity in the size of a restrictor channel feeding the chamber as well as all other portions of the fluidic path to the ink jet chamber. It is, therefore, important to control the thickness of the compliant material so as not to allow it to alter the dimensions of the fluidic path including the chamber thereby assuring uniformity from channel to channel within the ink jet apparatus.

In this connection, it is particularly important to restrict the flow of compliant material into the annular area between the transducer foot and the structural body supporting the transducer and the feet. It is also important to control the undesirable flow of the compliant material in a way which would force the diaphram into the restrictor channels associated with the chamber. It is also important to control the thickness of the compliant material to assure the proper seal between the various laminated layers of the ink jet apparatus. In this regard, it must be appreciated that the laminated structure is subjected to a compressing force by, for example, the screws which may be utilized to change the various laminated layers in place. Variations in the clamping pressure can result in more or less flow of the elastic material changing the characteristics of the ink jet as a result.

SUMMARY OF THE INVENTION

It is an object of this invention to assure uniformity from channel to channel in an ink jet apparatus including a plurality of channels.

It is a further object of this invention to control the flow of compliant material.

It is a still further object of this invention to accommodate tolerances in variations in the clamping pressure of the laminated ink jet apparatus.

It is a further object of this invention to assure that the restrictor channels are of uniform dimension without blockage of a diaphram.

It is also an object of this invention to assure effective sealing between the parts in a laminated structure.

In accordance with these and other objects of the invention, a preferred embodiment of the invention comprises an ink jet apparatus for forming one or more ink jet chambers, transducer means including a transducer and supporting structure juxtaposed to the means for forming one or more ink jet chambers and a diaphram between the means for forming one or more ink jet chambers and the transducer means.

In accordance with this invention, a compliant material is inserted between the diaphram and the transducer means. Spacer means are also inserted between the diaphram and the transducer means adjacent the compliant material. The means for forming one or more ink jet chambers, the transducer means, the diaphram, the compliant material and the spacer means are then clamped with the spacer means controlling the thickness of the compliant material and thus the flow of the compliant material toward and around the fluid path.

In one embodiment of the invention, spacer means comprises a plurality of spacer elements. Spacer elements may be located around the compliant material. In another embodiment of the invention, spacer means include an opening and the compliant material is positioned within the opening.

DETAILED DESCRIPTION OF A PREFERRED EMBODIMENT

Figure 1:
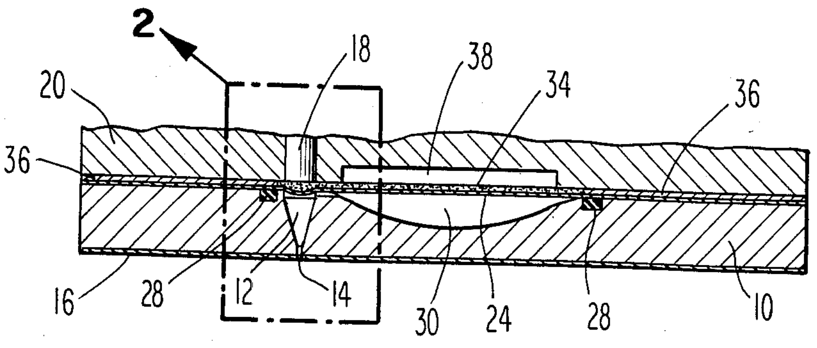
FIG. 1 is a sectional view of an ink jet apparatus embodying the invention.
Figure 2:
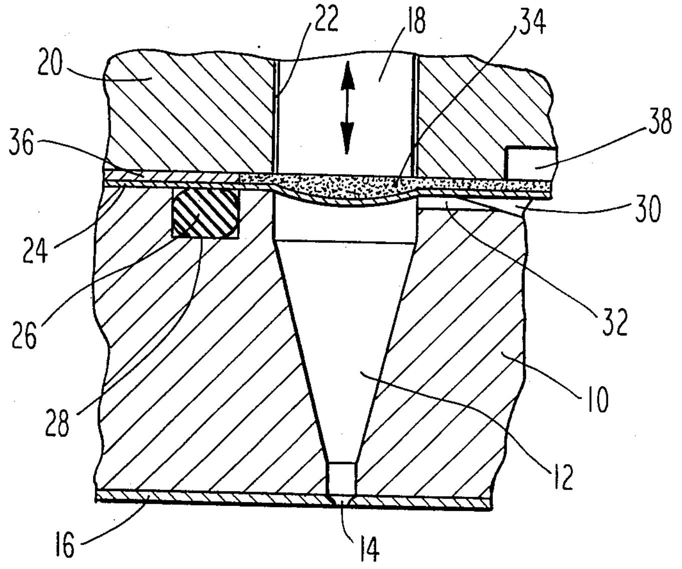
FIG. 2 is an enlarged view of a portion of the apparatus shown in FIG. 1.

Referring to FIGS. 1 and 2, a laminated ink jet structure is disclosed comprising a chamber plate which forms a plurality of ink jet chambers 12 having an orifice 14 as provided by an orifice plate 16. The volume of the chamber 12 varies in response to the state of energization of a transducer 18 mounted in a transducer supporting structure 20. As shown, the transducer 18 is juxtaposed to the chamber 12 and located within an opening 22 in the supporting structure 20.

As shown in FIGS. 1 and 2, a diaphram 24 is located between the transducer 18 including the supporting structure 20 of the chamber plate 10. As shown, the diaphram 24 is preloaded so as to extend slightly into the chamber 12. The preloading allows the diaphram 24 to follow the transducer 18 as it retracts from the chamber 12 upon energization to initiate filling. Upon de-energization, the transducer 18 returns to the position shown in FIG. 2. This motion of the transducer 18 is depicted by the arrows shown in FIG. 2. A gasket 26 is located in a groove 28 so as to assure a liquid seal between the diaphram 24 and the chamber plate 10. The chamber 12 is supplied with ink from a reservoir 30. For this purpose, a restrictor opening 32 is located adjacent to diaphram 24.

As shown in the aforementioned U.S. Pat. No. 4,418,355, a viscous or compliant material may be utilized between the diaphram and the transducer supporting structure 20 so as to achieve the preloading of the diaphram 24. In accordance with this invention, the same compliant material 34 is utilized. However, the thickness of the compliant material 34 is carefully regulated so as to assure the proper fluidic dimensions of the chamber 12, the restrictor 32 and the associated reservoir 30. In this connection, a spacer 36 is provided having an opening 38 (best shown in FIG. 3) receiving the compliant material 34. Because of the rigidity of the spacer 36 and its incompressibility, clamping of the laminated structure as shown in FIGS. 1 and 2 has little or no effect on the thickness of the compliant material 34 because the material essentially takes on the thickness of the spacer 36 except at the chamber 12 and a recess 38 in the transducer supporting structure 20.

It will be noted from FIGS. 1 and 2 that the compliant material 34 does not extend over to the gasket 26. As a consequence, the gasket 26 is free to make contact with a solid surface formed by the diaphram 24 and the spacer 36.

It will also be appreciated that the compliant material 34 does flow. It is this flow which results in the bulge at the chamber 12 and the necessary preloading of the diaphram 24. However, this flow is desirable and the spacer 36 serves to restrain the other flow to a controlled level so as to assure the proper fluidic dimensions and uniformity from channel to channel within a structure. It will be noted that the compliant material 34 does not flow up into the hole 22 receiving the transducer 18 as shown in FIG. 2. Although some slight degree of flow is possible, use of the spacer 36 restricts that degree of flow to an acceptable level.

Figure 3:
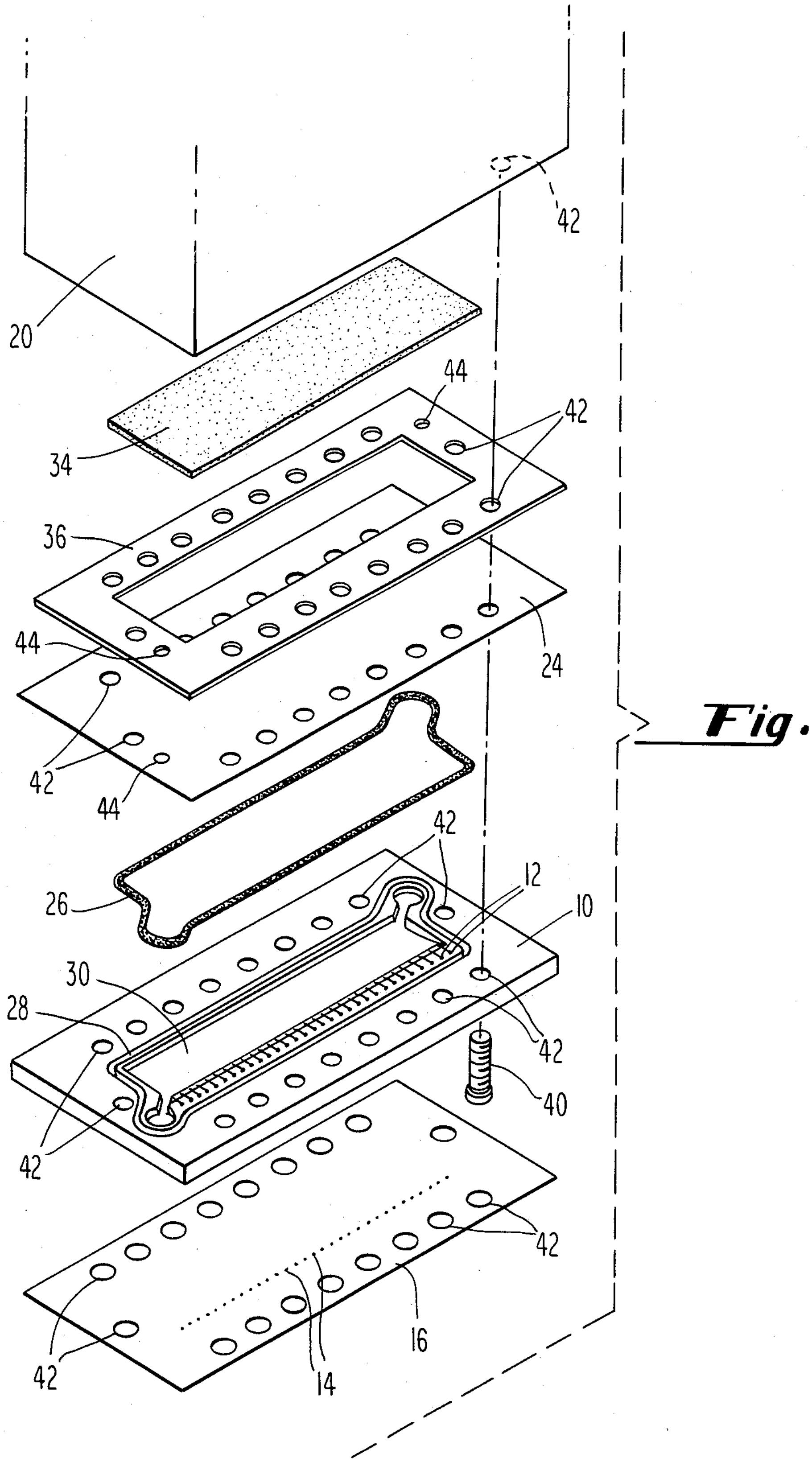
FIG. 3 is an exploded view of the ink jet apparatus shown in FIG. 1.

Referring now to FIG. 3, it will be appreciated that the chamber plate 10 comprises an array of ink jet chambers 12. It will also be appreciated that the opening in the spacer 36 is substantially rectangular and corresponds with the rectangular shape of the compliant material 34. Particularly suitable compliant material easily configured to the rectangular shape are transfer adhesives (e.g. 3M company's acrylic base Scotchbrand A-10 acrylic adhesive Y-9460 and silicone gels).

It will be appreciated that clamping of the structure shown in FIG. 3 is achieved by a series of screws 40 which are located along the edges of the structure. The structure includes openings 42 in each of the layers of the structure to receive these screws. Note additional holes 44 in the diaphram 24 and the spacer 36 which are aligned with similar holes in the transducer structure 20. It will, of course, be appreciated that regardless of the torquing of the screws 40, the compression of the compliant material 34 is limited by the spacer 36.

Figure 4:
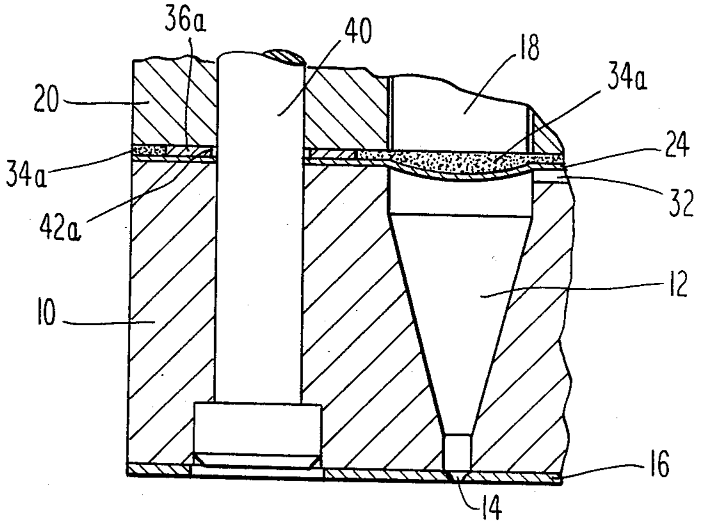
FIG. 4 is an enlarged sectional view of yet another embodiment of the invention.

Reference will now be made to FIG. 4 wherein the diaphram 24 is shown juxtaposed to a plurality of individual spacer elements in the form of washers **36*a* having openings 42*a*. The principal portion of the compliant material 34*a* is substantially surrounded by the washers 36*a*. Although the compliant material 34*a* is free to flow outwardly between the washers 36*a*, the overall thickness achieved by the compliant material 34*a* is substantially controlled by the spacer elements 36*a***.

Although a particular compliant material 34 has been described, it will be appreciated that other compliant materials may be utilized. It will also be appreciated that the spacer elements may take various shapes and configurations. For example, a convoluted spacer element may be utilized with the compliant material having a shape generally conforming with that convoluted configuration. However, in each instance, the thickness of the spacer element is substantially uniform over its entirety. Preferably, the compliant material is substantially equal to or slightly greater than the thickness of the spacer element. For example, the spacer element may have a thickness of 0.00381 cm while the thickness of the compliant material may range from 0.00381 cm to 0.00508 cm prior to assembly.

For other details concerning the construction of the jet and its operation, reference is made to the aforesaid U.S. Pat. No. 4,418,355 and the aforesaid U.S. patent applications Ser. Nos. 336,603 and 576,582 which are incorporated herein by reference.

Although particular embodiments of the invention have been shown and described, other embodiments, and modifications thereof will fall within the true spirit and scope of the invention as set forth in the appended claims.

I claim:

1. An ink jet apparatus comprising:

means for forming an ink jet chamber having an orifice;

transducer means including a transducer and supporting structure juxtaposed to said chamber;

a diaphram between said means for forming a chamber and said transducer means;

compliant material located between said transducer means and said diaphram; and spacer means also located between said diaphram and said transducer means, the overall thickness of said compliant material being controlled by the thickness of said spacer means.

2. The ink jet apparatus of claim 1 wherein said spacer means comprises a plate having an opening aligned with said chamber and said transducer.

3. The ink jet apparatus of claim 1 wherein said means for forming an ink jet chamber includes a reservoir coupled to said chamber, said opening and said spacer means being aligned with said reservoir and said chamber.

4. The ink jet apparatus of claim 2 including a plurality of chambers wherein said means for forming said ink jet chamber forms a plurality of chambers coupled to said reservoir, said plurality of transducers being juxtaposed to said plurality of chambers, said opening being aligned with all of said chambers.

5. The ink jet apparatus of claim 4 wherein the thickness of said compliant material is substantially uniform over a substantial portion of said opening.

6. The ink jet apparatus of claim 5 wherein the thickness of said compliant material is substantially greater at said chambers.

7. The ink jet apparatus of claim 2 wherein the thickness of said compliant material is substantially uniform over a substantial portion of said opening.

8. The ink jet apparatus of claim 7 wherein the thickness of said compliant material is substantially greater at said chambers.

9. The ink jet apparatus of claim 1 wherein said spacer means comprises a plurality of washers.

10. The ink jet apparatus of claim 1 wherein said means for forming an ink jet chamber includes a reservoir coupled to said chamber, said washers being located outwardly from said reservoir and said chamber.

11. The ink jet apparatus of claim 9 including a plurality of chambers and a reservoir coupled to said chambers, said washers being located outwardly from said chambers.

12. The ink jet apparatus of claim 11 wherein the thickness of said compliant material is substantially uniform over a substantial portion thereof.

13. The ink jet apparatus of claim 12 wherein the thickness of said compliant material is substantially greater at said chambers.

14. The ink jet apparatus of claim 10 wherein the thickness of said compliant material is substantially uniform.

15. The ink jet apparatus of claim 14 wherein the thickness of said compliant material is substantially greater at said chamber.

16. A method of assembling an ink jet apparatus comprising means for forming an ink jet chamber having an orifice, transducer means including a transducer and supporting structure juxtaposed to said means for forming an ink jet chamber and a diaphram between said means for forming a chamber and said transducer means, said method comprising the following steps:

inserting a compliant material between said diaphram and said transducer means;

inserting spacer means between said diaphram and said transducer means adjacent said compliant material;

clamping said compliant material and said spacer means between said means for forming an ink jet chamber and said transducer means; and controlling the thickness of the compliant material by the thickness of said spacer means during clamping.

17. The method of claim 16 wherein said spacer means comprises a plurality of spacer elements controlling the thickness of said compliant material.

18. The method of claim 17 wherein said spacer elements are located around said compliant material.

19. The method of claim 16 wherein said spacer means includes an opening receiving said compliant material.

* * * * *